(12) United States Patent
Vare et al.

(10) Patent No.: US 7,903,574 B2
(45) Date of Patent: Mar. 8, 2011

(54) SERVICE DISCOVERY MECHANISM IN BROADCAST TELECOMMUNICATION NETWORK

(75) Inventors: Jani Vare, Kaarina (FI); Jussi Vesma, Turku (FI); Harri Pekonen, Raisio (FI); Tommi Auranen, Turku (FI)

(73) Assignee: Nokia Corporation (FI)

( * ) Notice: Subject to any disclaimer, the term of this patent is extended or adjusted under 35 U.S.C. 154(b) by 672 days.

(21) Appl. No.: 11/686,600

(22) Filed: Mar. 15, 2007

(65) Prior Publication Data

US 2008/0225778 A1   Sep. 18, 2008

(51) Int. Cl.
| H04L 12/26 | (2006.01) |
|---|---|
| H04L 12/28 | (2006.01) |
| H04L 12/56 | (2006.01) |
| H04W 4/00 | (2009.01) |
| H04W 36/00 | (2009.01) |

(52) U.S. Cl. .......... 370/252; 370/254; 370/331; 455/436
(58) Field of Classification Search ............. None
See application file for complete search history.

(56) References Cited

U.S. PATENT DOCUMENTS

| 6,400,720 | B1 * | 6/2002 | Ovadia et al. ............ 370/395.64 |
| 6,467,093 | B1 * | 10/2002 | Inoue et al. ................... 725/151 |
| 6,654,901 | B1 * | 11/2003 | Nakai et al. ...................... 714/1 |
| 6,701,526 | B1 * | 3/2004 | Trovato ............................ 725/39 |
| 6,791,949 | B1 * | 9/2004 | Ryu et al. ....................... 370/254 |
| 6,985,189 | B1 * | 1/2006 | Takada et al. .................. 348/558 |
| 7,155,448 | B2 * | 12/2006 | Winter ............................ 707/101 |
| 7,451,469 | B2 * | 11/2008 | Barrett et al. ................... 725/43 |
| 7,486,640 | B2 * | 2/2009 | Borsos et al. .................. 370/331 |
| 7,596,118 | B2 * | 9/2009 | Kim et al. ...................... 370/330 |
| 7,602,801 | B2 * | 10/2009 | Hayashi et al. ................ 370/429 |
| 2003/0100307 | A1 * | 5/2003 | Wolochow et al. ........... 455/440 |
| 2005/0091280 | A1 * | 4/2005 | Winter ........................ 707/104.1 |
| 2006/0053450 | A1 | 3/2006 | Saarikivi et al. |
| 2006/0253544 | A1 * | 11/2006 | Luoma et al. .................. 709/217 |
| 2007/0055786 | A1 * | 3/2007 | Pohjolainen et al. .......... 709/230 |
| 2007/0086465 | A1 * | 4/2007 | Paila et al. ..................... 370/394 |
| 2007/0100984 | A1 * | 5/2007 | Jansky et al. .................. 709/223 |

(Continued)

FOREIGN PATENT DOCUMENTS

EP   1 887 803 A   2/2008

(Continued)

OTHER PUBLICATIONS

International Search Report from International Application No. PCT/IB2008/000721 dated Feb. 19, 2009, 6 pages.

(Continued)

*Primary Examiner* — Gregory B Sefcheck
(74) *Attorney, Agent, or Firm* — Banner & Witcoff, Ltd.

(57) ABSTRACT

Aspects of the invention are directed to service discovery in a digital broadcast network. A service discovery descriptor, which may be electronic service guide-provider and cell specific, provides mapping between a service identifier, a logical channel identifier, and a physical channel, which may be characterized by a frame identifier and a slot identifier, that is, each physical channel may have one or more slots within one or more frames. A neighboring service discovery descriptor provides mapping for the service available within neighboring cells. Aspects of the invention are directed to an encapsulation protocol that encapsulates variable length data, including, but not limited to, the service discovery descriptor and the neighboring service discovery descriptor, into fixed length data stream packets.

26 Claims, 18 Drawing Sheets

U.S. PATENT DOCUMENTS

| | | | |
|---|---|---|---|
| 2007/0107013 A1* | 5/2007 | Seppala et al. | 725/39 |
| 2007/0123244 A1* | 5/2007 | Paila | 455/419 |
| 2007/0168534 A1* | 7/2007 | Hiltunen et al. | 709/230 |
| 2007/0217758 A1* | 9/2007 | Yahata et al. | 386/52 |
| 2007/0240189 A1* | 10/2007 | Paila | 725/62 |
| 2008/0037956 A1* | 2/2008 | Nallur et al. | 386/112 |
| 2008/0040761 A1* | 2/2008 | Xu et al. | 725/105 |
| 2008/0155596 A1* | 6/2008 | Rosberg et al. | 725/39 |
| 2008/0189540 A1* | 8/2008 | Jansky | 713/2 |
| 2009/0260041 A1* | 10/2009 | Mcginn et al. | 725/62 |

FOREIGN PATENT DOCUMENTS

| | | |
|---|---|---|
| WO | 2004/056096 A | 7/2004 |
| WO | 2004/066652 A | 8/2004 |

OTHER PUBLICATIONS

Kutscher D., et al., "Service Maps for Heterogeneous Network Environments", Mobile Data Management, 2006, May 10-12, 2006.
ETSI EN 300 468 V1.7.1, Digital Video Broadcasting (DVB); Specification for Service Information (SI) in DVB Systems, Dec. 2005, pp. 1-106, European Broadcasting Union.

* cited by examiner

```
service_discovery_descriptor () {
    descriptor_tag                              2
    version_number                              6
   ESGproviderID                                8
    descriptor_length                           8
    service_loop_length                         8
        for (j=0;j<N;j++) {
            serviceID                          16
            reserved_future_use                 6
            logical_channel_id                  8
            physical_channel_id                 8
            fec_indicator                       1
            if (fec_indicator == 0x01){
                frame_size                      7
            }
            slot_loop_length                    8
            for (k=0;k<N;k++) {
                slot_id                         8
            }
            frame_loop_length                   8
            for (l=0;l<N;l++) {
                frame_id                        8
            }
        }
    CRC_32                                     32
}
```

FIG. 5

```
neighboring_service_discovery_descriptor () {
    descriptor_tag                              2
    version_number                              6
    descriptor_length                           8
    network_id                                  8
    ESGproviderID
    cell_loop_length                            8
    for (i=0;i<N;i++) {
        reserved_future_use                     6
        cell_id                                 10
        frequency                               32
        service_loop_length                     8
        for (j=0;j<N;j++) {
            serviceID                           16
            logical_channel_id                  8
            physical_channel_id                 8
            fec_indicator                       1
            if (fec_indicator == 0x01){
                frame_size                      7
            }
            slot_loop_length                    8
            for (k=0;k<N;k++) {
                slot_id                         8
            }
            frame_loop_length                   8
            for (l=0;l<N;l++) {
                frame_id                        8
            }
        }
    }
    CRC_32                                      32
}
```

SERVICE DISCOVERY MECHANISM IN BROADCAST TELECOMMUNICATION NETWORK

FIELD OF THE INVENTION

The invention relates generally to communications networks. More specifically, the invention relates to discovery of services in a communication network.

BACKGROUND OF THE INVENTION

Digital broadband broadcast networks enable end users to receive digital content including video, audio, data, and so forth. Using a mobile terminal, a user may receive digital content over a wireless digital broadcast network. Digital content can be transmitted in a cell within a network. A cell may represent a geographical area that may be covered by a transmitter in a communication network. A network may have multiple cells and cells may be adjacent to other cells.

A receiver device, such as a mobile terminal, may receive a program or service in a data or transport stream. The transport stream carries individual elements of the program or service such as the audio and video components of a program or service. Typically, the receiver device locates the different components of a particular program or service in a data stream through Program Specific Information (PSI) or Service Information (SI) embedded in the data stream. However, PSI or SI signaling may be insufficient in some wireless communications systems, such as Digital Video Broadcasting—Handheld (DVB-H) systems. Use of PSI or SI signaling in such systems may result in a sub-optimal end user experience as the PSI and SI tables carrying in PSI and SI information may have long repetition periods. In addition, PSI or SI signaling requires a large amount of bandwidth which is costly and also decreases efficiency of the system.

PSI/SI in ETSI EN 300 468 [V1.7.1 (2006-05)] Digital Video Broadcasting (DVB); Specification for Service Information (SI) in DVB systems, and U.S. application Ser. No. 11/443,317, entitled, Service Discovery Section, filed May 31, 2006 by Jani Väre et al. disclose conventional techniques for signaling service-discovery information.

MPEG-2 TS defines an encapsulation mechanism for data carried over DVB. Generic Stream Encapsulation (GSE) defines an encapsulation protocol for data carried over digital video broadcast specifications, such as DVB-S2, a second generation specification for Digital Video Broadcast—Satellite. The Generic Stream Encapsulation (GSE) protocol, which is under definition within the Generic Data Broadcasting & Service Information Protocols (GBS) group of DVB, provides an efficient means for encapsulating IP and other network layer packets over the generic Stream profile of the DVB-S2 physical layer.

More efficient and more robust signaling of service-discovery information and encapsulation of data for digital broadcast networks would enable faster service discovery and reduced latency thereby advancing the art.

BRIEF SUMMARY OF THE INVENTION

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the more detailed description below.

Aspects of the invention are directed to service discovery in a digital broadcast network. A service discovery descriptor, which may be electronic service guide-provider and cell specific, provides mapping between a service identifier, a logical channel identifier, and a physical channel, which may be characterized by a frame identifier and a slot identifier, that is, each physical channel may have one or more slots within one or more frames. A neighboring service discovery descriptor provides mapping for the service available within neighboring cells. Aspects of the invention are directed to an encapsulation protocol that encapsulates variable length data, including, but not limited to, the service discovery descriptor and the neighboring service discovery descriptor, into fixed length data stream packets.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIG. 5 shows an example of a syntax of a service discovery descriptor for providing parameters for service discovery in accordance with one or more aspects of the invention.

FIG. 6 shows an example of a syntax of a neighbouring service discovery descriptor in accordance with one or more aspects of the invention.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

Figure 1:
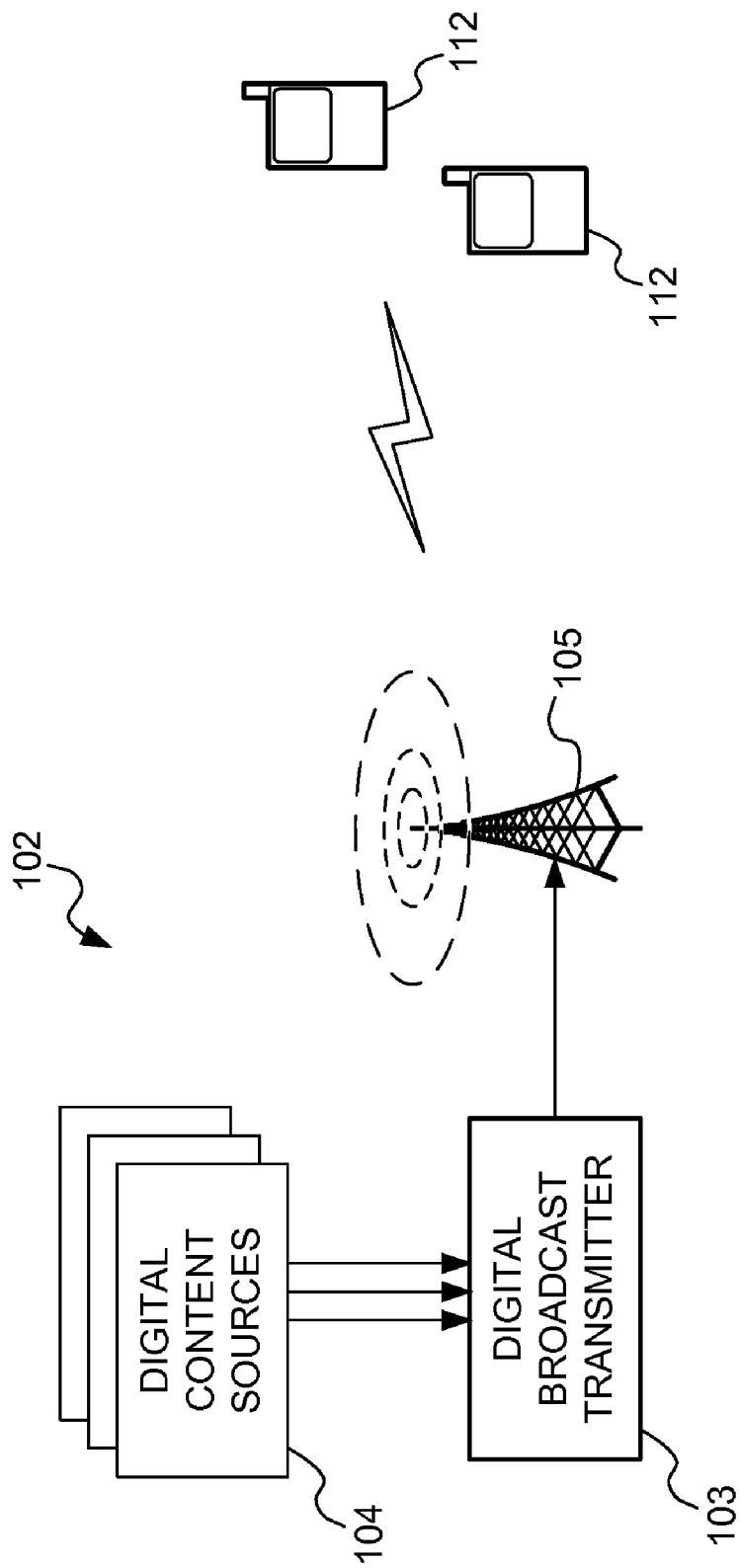
FIG. 1 illustrates a suitable digital broadband broadcast system 102 in which one or more illustrative embodiments of the invention may be implemented.

FIG. 1 illustrates a suitable digital broadband broadcast system 102 in which one or more illustrative embodiments may be implemented. Systems such as the one illustrated here may utilize a digital broadband broadcast technology, for example Digital Video Broadcast—Handheld (DVB-H) or next generation DVB-H networks.

Examples of other digital broadcast standards which digital broadband broadcast system 102 may utilize include Digital Video Broadcast—Terrestrial (DVB-T), Integrated Services Digital Broadcasting—Terrestrial (ISDB-T), Advanced Television Systems Committee (ATSC) Data Broadcast Standard, Digital Multimedia Broadcast-Terrestrial (DMB-T), Terrestrial Digital Multimedia Broadcasting (T-DMB), Satellite Digital Multimedia Broadcasting (S-DMB), Forward Link Only (FLO), Digital Audio Broadcasting (DAB), and Digital Radio Mondiale (DRM). Other digital broadcasting standards and techniques, now known or later developed, may also be used. Aspects of the invention may also be applicable to other multicarrier digital broadcast systems such as, for example, T-DAB, T/S-DMB, ISDB-T, and ATSC, proprietary systems such as Qualcomm MediaFLO/FLO, and non-traditional systems such 3GPP MBMS (Multimedia Broadcast/Multicast Services) and 3GPP2 BCMCS (Broadcast/Multicast Service).

Digital content may be created and/or provided by digital content sources 104 and may include video signals, audio signals, data, and so forth. Digital content sources 104 may provide content to digital broadcast transmitter 103 in the form of digital packets, e.g., Internet Protocol (IP) packets. A group of related IP packets sharing a certain unique IP address or other source identifier is sometimes described as an IP stream. Digital broadcast transmitter 103 may receive, process, and forward for transmission multiple IP streams from multiple digital content sources 104. The processed digital content may then be passed to digital broadcast tower 105 (or other physical transmission component) for wireless transmission. Ultimately, mobile terminals or devices 112 may selectively receive and consume digital content originating from digital content sources 104.

Figure 2:
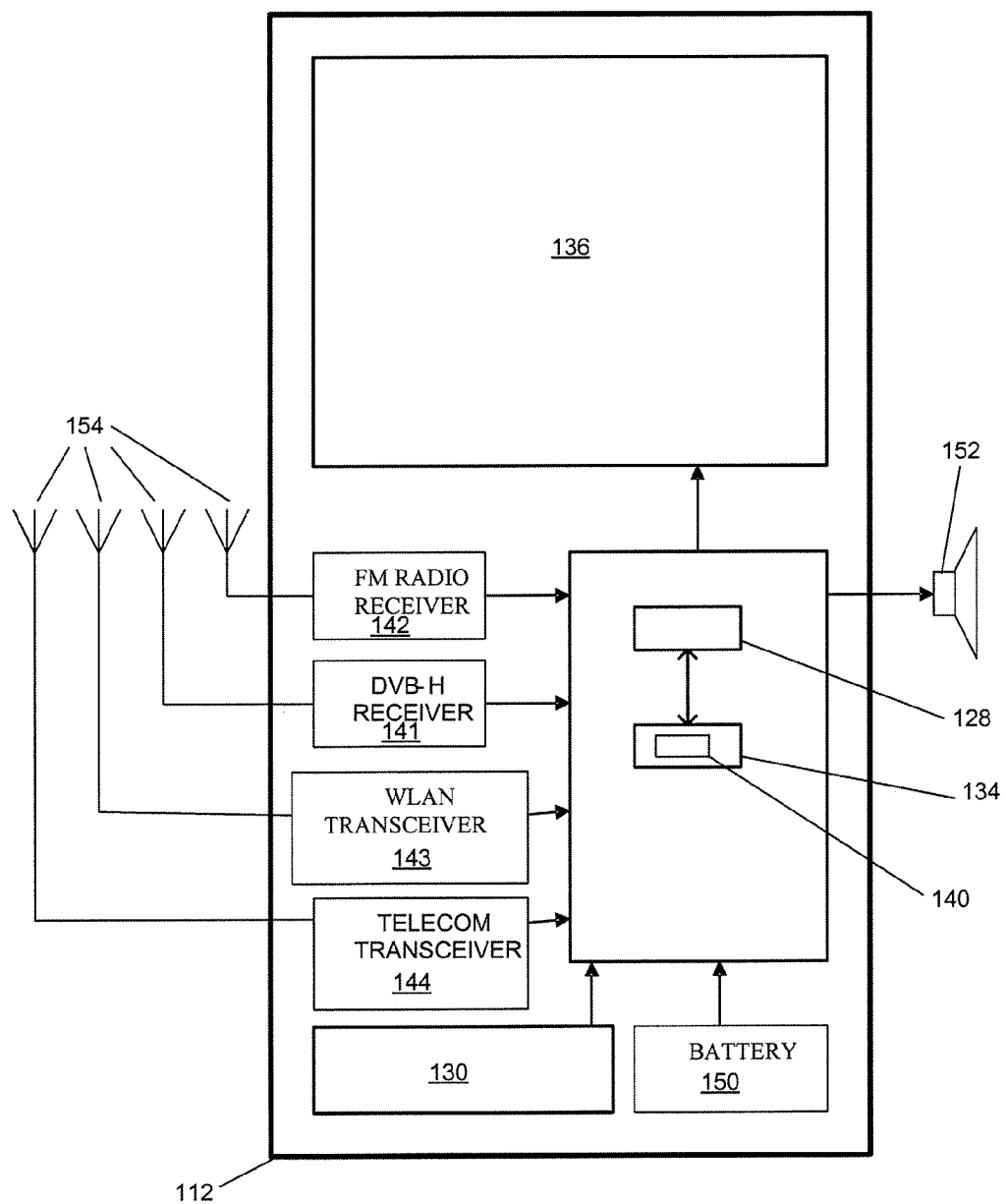
FIG. 2 illustrates an example of a mobile device in accordance with an aspect of the present invention.

As shown in FIG. 2, mobile device 112 may include processor 128 connected to user interface 130, memory 134 and/or other storage, and display 136, which may be used for displaying video content, service guide information, and the like to a mobile-device user. Mobile device 112 may also include battery 150, speaker 152 and antennas 154. User interface 130 may further include a keypad, touch screen, voice interface, one or more arrow keys, joy-stick, data glove, mouse, roller ball, touch screen, or the like.

Computer executable instructions and data used by processor 128 and other components within mobile device 112 may be stored in a computer readable memory 134. The memory may be implemented with any combination of read only memory modules or random access memory modules, optionally including both volatile and nonvolatile memory. Software 140 may be stored within memory 134 and/or storage to provide instructions to processor 128 for enabling mobile device 112 to perform various functions. Alternatively, some or all of mobile device 112 computer executable instructions may be embodied in hardware or firmware (not shown).

Mobile device 112 may be configured to receive, decode and process digital broadband broadcast transmissions that are based, for example, on the Digital Video Broadcast (DVB) standard, such as DVB-H, DVB-T, or DVB-MHP, through a specific DVB receiver 141. The mobile device may also be provided with other types of receivers for digital broadband broadcast transmissions. Additionally, receiver device 112 may also be configured to receive, decode and process transmissions through FM/AM Radio receiver 142, WLAN transceiver 143, and telecommunications transceiver 144. In one aspect of the invention, mobile device 112 may receive radio data stream (RDS) messages.

In an example of the DVB standard, one DVB 10 Mbit/s transmission may have 200, 50 kbit/s audio program channels or 50, 200 kbit/s video (TV) program channels. The mobile device 112 may be configured to receive, decode, and process transmission based on the Digital Video Broadcast-Handheld (DVB-H) standard or other DVB standards, such as DVB-MHP, DVB-Satellite (DVB-S), or DVB-Terrestrial (DVB-T). Similarly, other digital transmission formats may alternatively be used to deliver content and information of availability of supplemental services, such as ATSC (Advanced Television Systems Committee), NTSC (National Television System Committee), ISDB-T (Integrated Services Digital Broadcasting—Terrestrial), DAB (Digital Audio Broadcasting), DMB (Digital Multimedia Broadcasting), FLO (Forward Link Only) or DIRECTV. Additionally, the digital transmission may be time sliced, such as in DVB-H technology. Time-slicing may reduce the average power consumption of a mobile terminal and may enable smooth and seamless handover. Time-slicing entails sending data in bursts using a higher instantaneous bit rate as compared to the bit rate required if the data were transmitted using a traditional streaming mechanism. In this case, the mobile device 112 may have one or more buffer memories for storing the decoded time sliced transmission before presentation.

In addition, an Electronic Service Guide (ESG) may be used to provide program or service related information. Generally, an Electronic Service Guide (ESG) enables a terminal to communicate what services are available to end users and how the services may be accessed. The ESG includes independently existing pieces of ESG fragments. Traditionally, ESG fragments include XML and/or binary documents, but more recently they have encompassed a vast array of items, such as for example, a SDP (Session Description Protocol) description, textual file, or an image. The ESG fragments describe one or several aspects of currently available (or future) service or broadcast program. Such aspects may include for example: free text description, schedule, geographical availability, price, purchase method, genre, and supplementary information such as preview images or clips. Audio, video and other types of data including the ESG fragments may be transmitted through a variety of types of networks according to many different protocols. For example, data can be transmitted through a collection of networks usually referred to as the "Internet" using protocols of the Internet protocol suite, such as Internet Protocol (IP) and User Datagram Protocol (NDP). Data is often transmitted through the Internet addressed to a single user. It can, however, be addressed to a group of users, commonly known as multicasting. In the case in which the data is addressed to all users it is called broadcasting.

One way of broadcasting data is to use an IP datacasting (IPDC) network. IPDC is a combination of digital broadcast and Internet Protocol. Through such an IP-based broadcasting network, one or more service providers can supply different types of IP services including on-line newspapers, radio, and television. These IP services are organized into one or more media streams in the form of audio, video and/or other types of data. To determine when and where these streams occur, users refer to an electronic service guide (ESG). One type of DVB is Digital Video Broadcasting-Handheld (DVB-H). The DVB-H is designed to deliver 10 Mbps of data to a battery-powered terminal device.

DVB transport streams deliver compressed audio and video and data to a user via third party delivery networks. Moving Picture Expert Group (MPEG) is a technology by which encoded video, audio, and data within a single program is multiplexed, with other programs, into a transport stream (TS). The TS is a packetized data stream, with fixed length packets, including a header. The individual elements of a program, audio and video, are each carried within packets having a unique packet identification (PID). To enable a receiver device to locate the different elements of a particular program within the TS, Program Specific Information (PSI), which is embedded into the TS, is supplied. In addition, additional Service Information (SI), a set of tables adhering to the MPEG private section syntax, is incorporated into the TS. This enables a receiver device to correctly process the data contained within the TS.

As stated above, the ESG fragments may be transported by IPDC over a network, such as for example, DVB-H to destination devices. The DVB-H may include, for example, separate audio, video and data streams. The destination device must then again determine the ordering of the ESG fragments and assemble them into useful information.

Figure 3:
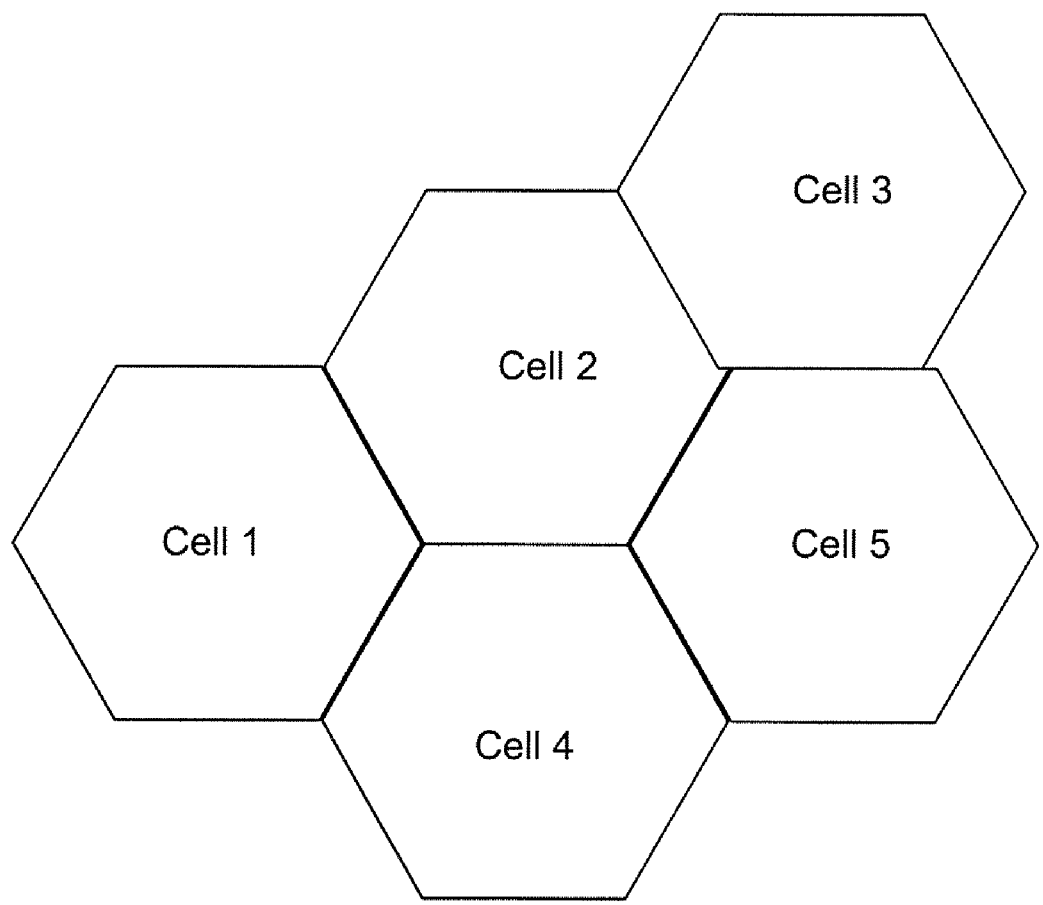
FIG. 3 illustrates an example of cells, each of which may be covered by a different transmitter in accordance with an aspect of the present invention.

In a typical communication system, a cell may define a geographical area that may be covered by a transmitter. The cell may be of any size and may have neighboring cells. FIG. 3 illustrates schematically an example of cells, each of which may be covered by a different transmitter. In this example, Cell 1 represents a geographical area that is covered by a transmitter for a communication network. Cell 2 is next to Cell 1 and represents a second geographical area that may be covered by a different transmitter. Cell 2 may, for example, be a different cell within the same network as Cell 1. Alternatively, Cell 2 may be in a network different from that of Cell 1. Cells 1, 3, 4, and 5 are neighboring cells of Cell 2, in this example.

Figure 4:
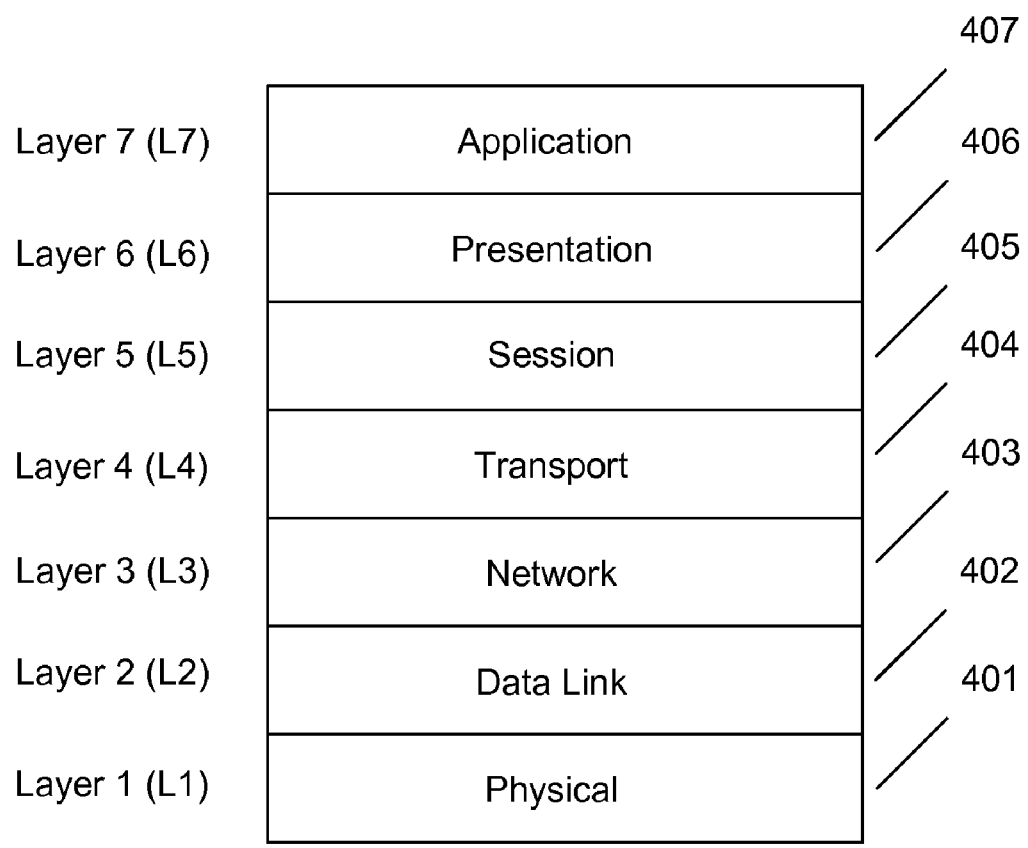
FIG. 4 illustrates the OSI reference model as containing seven layers.

Communication between network components may be accomplished via the Open Systems Interconnection (OSI) standard. The OSI framework of the process for communication between different network components may be structured as seven layers or categories as described by the OSI reference model. FIG. 4 illustrates the OSI reference model as containing seven layers. Typically, layers 4-7 pertain to end-to-end communications between message source and message destination and layers 1-3 pertain to network access. Layer 1 (401, the physical layer) deals with the physical means of sending data over lines. This may include, for example, electrical, mechanical or functional control of data circuits. Layer 2 (402, the data link layer) pertains to procedures and protocols for operating communication lines. Also, detection and correction of message errors may be accomplished in Layer 2. Layer 3 (403, network layer) determines how data is transferred between different network components. Also, Layer 3 (403) may address routing in networks. Layer 4 (404, Transport layer) pertains to defining rules for information exchange. Layer 4 (404) may also be involved in the end-to-end delivery of information within and between networks. This information may further include error recovery and flow control. Layer 5 (405, Session layer) pertains to dialog management in Layer 5 (405) and may control use of basic communications facilities provided by Layer 4 (404, transport layer). Layer 6 (406, presentation layer) pertains to providing compatible interactivity between data formats. Layer 7 (407, application layer) provides functions for particular applications services. These functions may include file transfer, remote file access and/or virtual terminals.

FIG. 5 shows an example of a syntax of a service discovery descriptor for providing parameters for service discovery in accordance with one or more aspects of the invention. In the example the notation follows ETSI EN 300 468. Such a service discovery descriptor may be specific to an Electronic-Service-Guide (ESG) provider and/or a particular cell and may provide a mapping between a service identifier (e.g., serviceID), a logical channel identifier (e.g., logical-channel_id), and a physical channel identifier (e.g., physical_channel_id). FIG. 5 shows the fields of the example service discovery descriptor in a left-hand column and the size in bits of those fields in a right-hand column.

Referring to FIG. 5, a descriptor tag parameter (e.g., descriptor_tag) may be used for indicating the type of the service discovery descriptor. For example, a value of 0x01 could indicate that the service-discovery_descriptor is a service_discovery_descriptor, as opposed to a different type of descriptor.

A version number (e.g., version_number) may be used for indicating a version of the service discovery descriptor. The version number field may be used by a terminal to detect whether there are any changes within the service discovery descriptor since the terminal previously examined the service discovery descriptor.

An ESG provider identifier (e.g., ESGproviderID) may be used for identifying an ESG provider of the services announced within the service discovery descriptor. In accordance with one or more aspects of the invention, services listed within a particular service discovery descriptor may be unique within an associated ESG provider identifier.

A service loop length, (e.g., service_loop_length) may be used for indicating a length of the loop that is located in the example service discovery descriptor between service_loop_length and CRC_32.

A service identifier (e.g., serviceID) may be used for uniquely identifying a service within the scope of an ESG provider (e.g., that of defined in Digital Video Broadcasting Convergence of Broadcast and Mobile Services (DVB-CBMS) or Open Mobile Alliance Mobile Broadcast Services (OMA BCAST)). A service identifier may be associated with one or more Internet Protocol (IP) streams (each of which may be identified by a respective IP address).

A logical channel identifier (e.g., logical channel_id) may be used for providing a one-to-one mapping with the service identifier (i.e. serviceID) and ESG provider identifier (i.e. ESGProviderID) pair. The logical channel identifier may identify the logical channel of the associated service identifier. The logical channel identifier may be used by the receiver for discovering a packet's portion of a specific logical channel in case there are packets from more than one logical channel available within a particular physical channel.

A physical channel identifier (e.g., physical_channel_id) may be used to identify a physical channel where an associated logical channel is carried.

An FEC (Forward Error Correction) indicator (e.g., fec_indicator) may be used for indicating whether or not FEC is used for an associated service. In one example, if the FEC indicator has been set to 0x01, then FEC is used for the associated service.

A frame size (e.g., frame_size) may be used to indicate a FEC frame size in case FEC is supported with the associated service.

A slot loop length (e.g., slot_loop_length) may be used for indicating a length of the loop that is located in the example service discovery descriptor between slot_loop_length and frame_loop_length. In accordance with at least one aspect of the invention, each slot loop iteration corresponds with a particular iteration within a frame loop.

A slot identifier (e.g., slot_id) may be used for identifying a slot in which an associated service is carried. A particular service may be carried within multiple slots, which are located within one or more frames.

A frame loop length (e.g., frame_loop_length) may be used for indicating a length of the loop that is located in the example service discovery descriptor between frame_loop_length and CRC_32. In accordance with at least one aspect of the invention, each frame loop iteration corresponds with a particular iteration within a particular slot loop.

A frame identifier (e.g., frame_id) may be use for identifying a particular frame. In accordance with at least one aspect of the invention, each frame may be associated with one or more slots.

The service discovery descriptor may further comprise a cyclic redundancy check code, in this example a 32 bit field CRC_32 as presented in ETSI EN 300 468. The service discovery descriptor may further comprise one or more fields of different lengths for future use (e.g., reserved_future_use).

Figure 7:
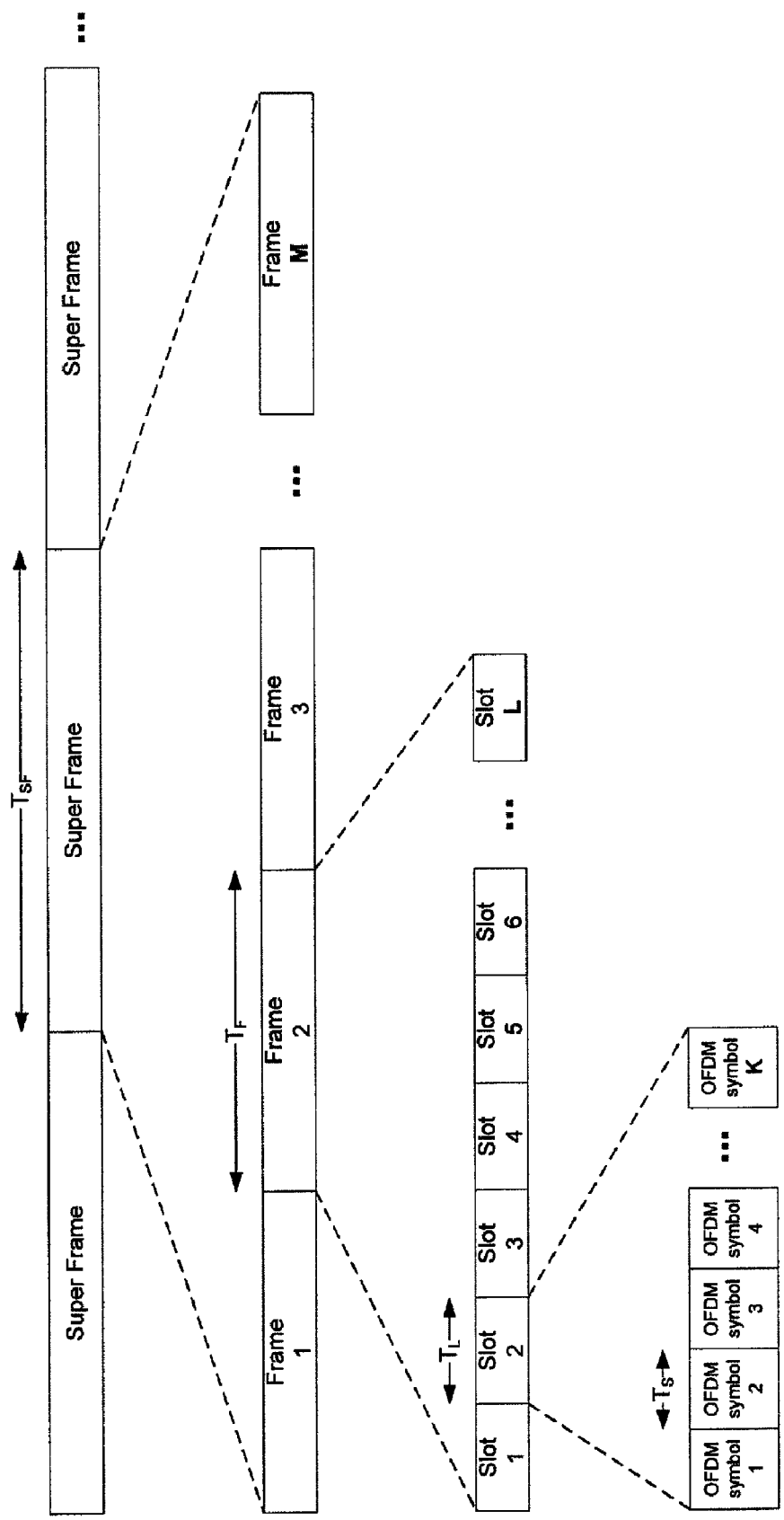
FIG. 7 shows an example frame and slot structure in accordance with at least one aspect of the invention.

FIG. 6 shows an example of a syntax of a neighbouring service discovery descriptor (e.g., neighbouring service_discoverydescriptor) in accordance with one or more aspects of the invention. Such a neighbouring service discovery descriptor may include a frame identifier (e.g., frame_id) and a slot identifier (e.g., slot_id), and each physical channel may have one or more slots within one or more frames. An example of the frame and slot structure is shown in FIG. 7.

A neighbouring service discovery descriptor in accordance with at least one aspect of the invention may provide mapping for the services available within neighbouring cells. In accordance with the example neighbouring service discovery descriptor of FIG. 6, a single descriptor may be provided per network. According to one or more aspects of the invention, an alternative version of the same descriptor could have information for multiple networks is carried within a single descriptor. FIG. 6 shows the fields of the example neighboring service discovery descriptor in a left-hand column and the size in bits of those fields in a right-hand column.

Referring to FIG. 6, a descriptor tag parameter (e.g., descriptor tag) may be used for indicating the type of the neighboring service discovery descriptor. For example, a value of 0x02 could indicate that the neighboring_service_discovery_descriptor is a neighboring_service_discovery descriptor, as opposed to a different type of descriptor.

A version number (e.g., version_number) may be used for indicating a version of the service discovery descriptor. The version number field may be used by a terminal to detect whether there are any changes within the neighboring service discovery descriptor since the terminal previously examined the neighboring service discovery descriptor.

A network identifier (e.g., network_id) may be used for indicating a network of the elements described within the neighboring service discovery descriptor.

An ESG provider identifier (e.g., ESGproviderID) may be used for identifying an ESG provider of the services announced within the neighboring service discovery descriptor. In accordance with one or more aspects of the invention, services listed within a particular neighboring service discovery descriptor may be unique within an associated ESG provider identifier. Hence, two serviceIDs with the same value may be mutually distinguished based on ESGproviderID.

A cell loop length (e.g., cell_loop_length) may be used to indicate a length of the cell loop, which appears in the example neighboring service discovery descriptor between cell_loop_length and CRC_32.

A cell identifier (e.g., cell_id) may be used for identifying a cell. In accordance with at least one aspect of the invention, each cell may be unique within one network.

A frequency field (e.g., frequency) may be used for indicating a frequency of the signal covering an area of the associated cell. The indicated frequency may be the channel center frequency.

A service loop length, (e.g., service_loop_length) may be used for indicating a length of the loop that is located in the example neighboring service discovery descriptor between service_loop_length and CRC_32.

A service identifier (e.g., serviceID) may be used for uniquely identifying a service within the scope of an ESG provider (e.g., that of defined in DVB-CBMS or OMA BCAST). A service identifier may be associated with one or more Internet Protocol (IP) streams (each of which may be identified by a respective IP address).

A logical channel identifier (e.g., logical channel id) may be used for providing a one-to-one mapping with the service identifier. The logical channel identifier may identify the logical channel of the associated service identifier. The logical channel identifier may be used by the receiver for discovering a packet's portion of a specific logical channel in case there are packets from more than one logical channel available within a particular physical channel.

A physical channel identifier (e.g., physical_channel_id) may be used to identify a physical channel where an associated logical channel is carried.

An FEC (Forward Error Correction) indicator (e.g., fec_indicator) may be used for indicating whether or not FEC is used for an associated service. In one example, if the FEC indicator has been set to 0x01, then FEC is used for the associated service.

A frame size (e.g., frame_size) may be used to indicate a FEC frame size in case FEC is supported with the associated service.

A slot loop length (e.g., slot_loop_length) may be used for indicating a length of the loop that is located in the example neighboring service discovery descriptor between slot_loop_length and frame_loop_length. In accordance with at least one aspect of the invention, each slot loop iteration corresponds with a particular iteration within a frame loop.

A slot identifier (e.g., slot_id) may be used for identifying a slot in which an associated service is carried. A particular service may be carried within multiple slots, which are located within one or more frames.

A frame loop length (e.g., frame_loop_length) may be used for indicating a length of the loop that is located in the example neighboring service discovery descriptor between frame_loop_length and CRC_32. In accordance with at least one aspect of the invention, each frame loop iteration corresponds with a particular iteration within a particular slot loop.

A frame identifier (e.g., frame_id) may be use for identifying a particular frame. In accordance with at least one aspect of the invention, each frame may be associated with one or more slots.

The service discovery descriptor may further comprise a cyclic redundancy check code, in this example a 32 bit field CRC_32 as presented in ETSI EN 300 468. The service discovery descriptor may further comprise one or more fields of different lengths for future use (e.g., reserved_future_use).

FIG. 7 shows an example frame and slot structure in accordance with at least one aspect of the invention. According to the example, the durations of a superframe $T_{SF}$, frame $T_F$, slot $T_L$, and symbol $T_S$ are fixed for one network configuration. All these may be configurable. If FFT mode is changed the symbol time $T_S$ changes correspondingly, e.g. if FFT size is changed from 2K to 8K, then the symbol time $T_S$ would be multiplied by four. Slot time $T_L$ can remain unchanged by changing K, the number of Orthogonal Frequency Division Multiplexing (OFDM) symbols within one slot. In the previous exemplary case, when FFT size is changed from 2K to 8K, the number of OFDM symbols in the slot K would be divided by four. A slot forms one (or an integer number of) interleaving block(s) (time interleaving). Slot size (in bits) determines the size of the interleaving block (or its integer fraction).

A physical channel (e.g., PHY_channel) may be determined as follows: slot_no={$s_1, s_2, s_3 \ldots, s_R$}, where $1 \leq R \leq L$; and frame_no={$f_1, f_2, f_3 \ldots, f_P$}, where $1 \leq P \leq M$. Thus, in the example of FIG. 7, each physical channel has at least one slot in one super frame. For example, slot_no={4} and frame_no={1}, means that PHY_channel has one slot (no. 4) in one frame (no. 1) during each super frame. As another example, slot_no={4} and frame_no={1, 2, 3, ..., M}, means that PHY_channel has one slot (no. 4) in each frame during each super frame. Various aspects of the physical channel are discussed in more detail below in connection with FIGS. 18 and 19.

Figure 8:
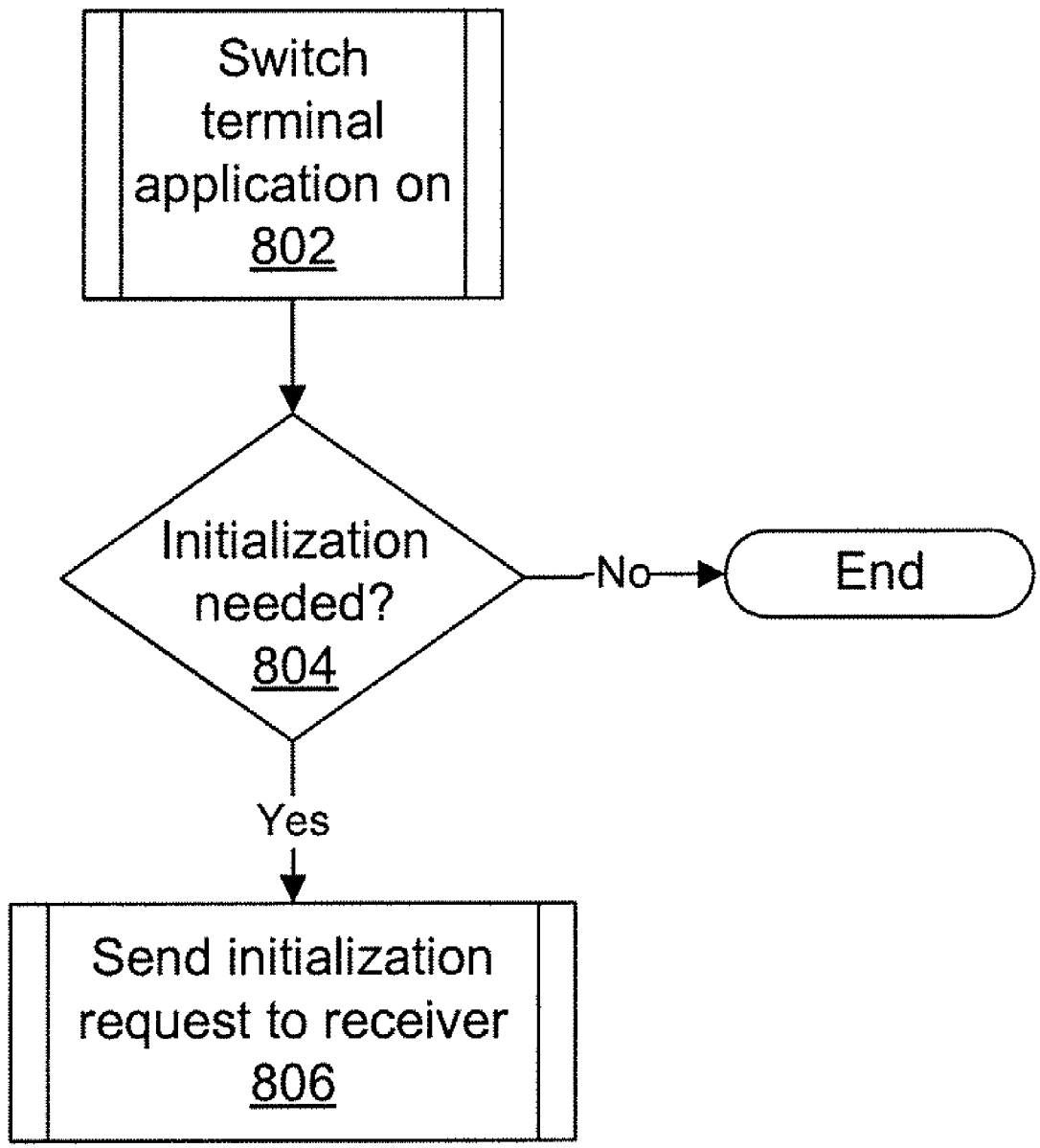
FIG. 8 is a flow chart of initialization and bootstrapping steps performed by a terminal in accordance with one or more aspects of the invention.

FIG. 8 is a flow chart of initialization and bootstrapping steps performed by a terminal in accordance with one or more aspects of the invention.

Initialization and bootstrapping refers to situations in which the terminal is switched on for the first time or is in a new place (e.g., a new cell) after moving from a previous location (e.g., a previous cell).

A terminal application, such as a mobile television application, is switched on, as shown at 802. If initialization is not needed, then the "no" branch from 804 is followed and processing ends. Otherwise, the "yes" branch from 804 is followed and an initialization request is sent to the receiver.

Figure 9:
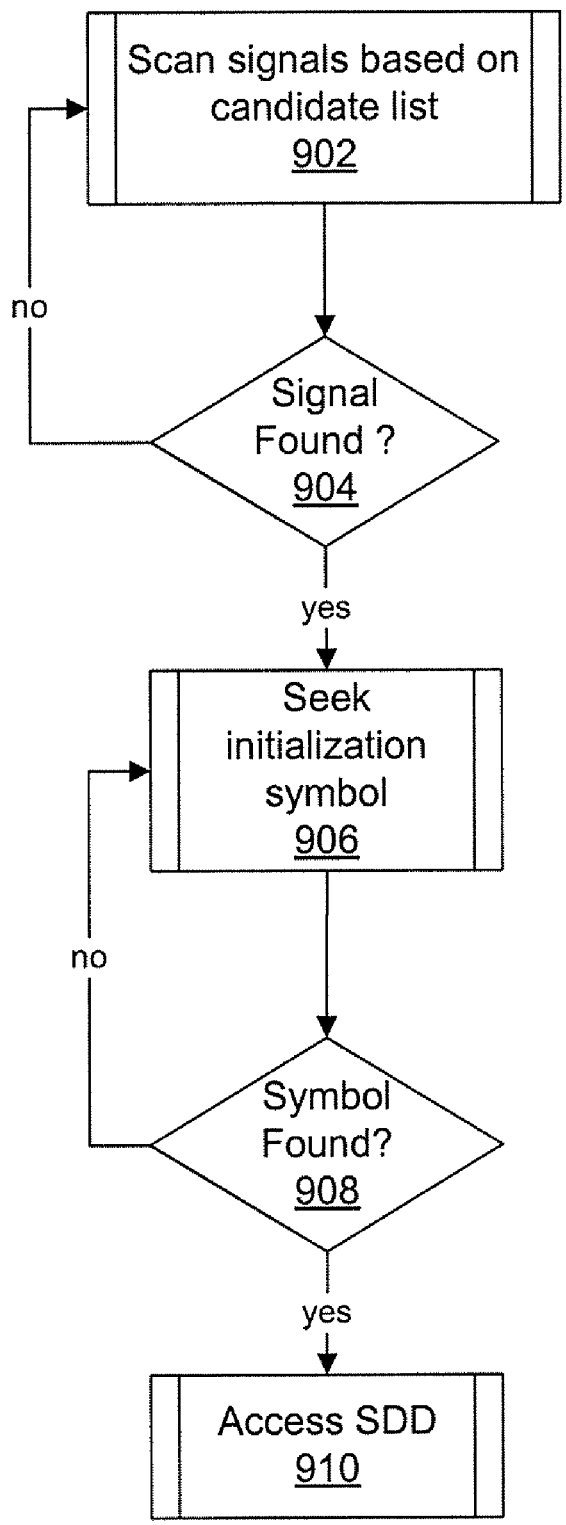
FIG. 9 is a flow chart of initialization and bootstrapping steps performed by a receiver, in accordance with one or more aspects of the invention.

FIG. 9 is a flow chart of initialization and bootstrapping steps performed by a receiver, in accordance with one or more aspects of the invention, for receiving the descriptors discussed above when transmitted with the transmission structure described in FIG. 7.

Signals are scanned based on a candidate list, as shown at 902. In accordance with at least one aspect of the invention, a default candidate list may be the full frequency range. Alternatively, the candidate list may be reduced in accordance with one or more rules for reducing the candidate list. Such rules may comprise reducing the candidate list to one or more recently used candidate lists stored in the terminal or any desired combination or permutation of such lists.

If the signal is not found, the "no" branch from 904 is followed, which causes 902 to be repeated. Otherwise, the "yes" branch from 904 is followed and initialization symbol is sought, as shown at 906. In accordance with at least one aspect of the invention, a "Pilot symbol" that includes FFT and other modulation parameters may be used for synchronizing to the actual signal.

If the symbol is not found, the "no" branch from 908 is followed, which causes 906 to be repeated. Otherwise, the "yes" branch from 908 is followed and the service discovery descriptor (SDD) is accessed, as shown at 910.

The service discovery descriptor may be transmitted within a given repetition interval, e.g., every 50 ms. Hence, the receiver can access the SDD by receiving data within 50 ms until the SDD is found.

Figure 10:
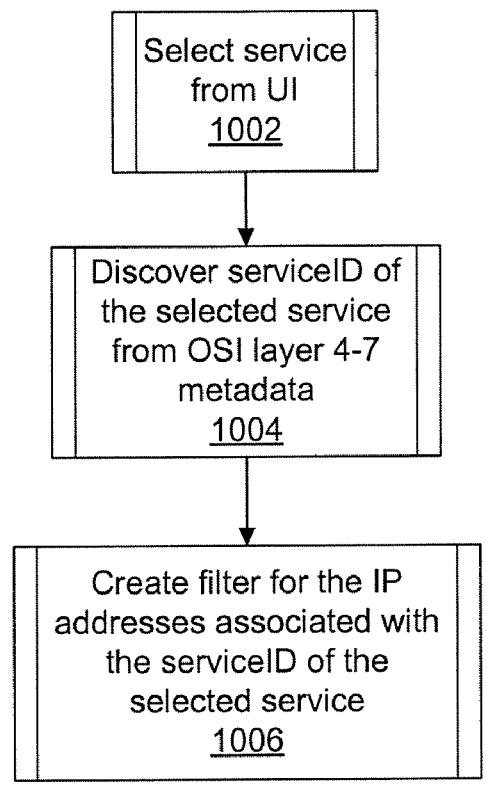
FIG. 10 is a flow chart showing steps performed by a terminal for performing service discovery and access within a current cell, based on previously received service discovery descriptor information in accordance with one or more aspects of the invention.

FIG. 10 is a flow chart showing steps performed by a terminal for performing service discovery and access within a current cell, based on previously received SDD information in accordance with one or more aspects of the invention.

A service is selected from the terminal's user interface, as shown at 1002. A service identifier for the selected service is then discovered from OSI layer 4-7 metadata, as shown at 1004. Metadata of this type may be ESG-level signaling data that maps services via service identifiers.

A filter is created for the IP addresses associated with the service identifier of the selected service, as shown at 1006. The terminal may then start waiting for data from the receiver.

Figure 11:
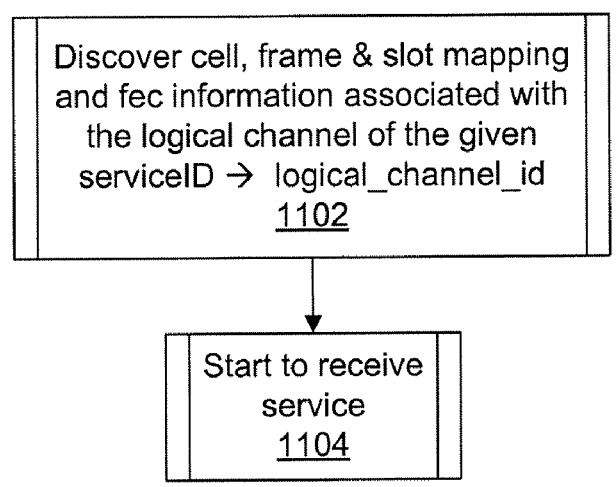
FIG. 11 is a flow chart showing steps performed by a receiver for performing service discovery and access within a current cell, based on previously received service discovery descriptor information in accordance with one or more aspects of the invention.

FIG. 11 is a flow chart showing steps performed by a receiver for performing service discovery and access within a current cell, based on previously received SDD information in accordance with one or more aspects of the invention.

The receiver discovers cell, frame and slot mapping and FEC information associated with the logical channel of the given service identifier, which map to a logical channel identifier, as shown at 1102. The receiver then starts receiving the identified service, as shown at 1104, and sends the received service data to the terminal.

Figure 12:
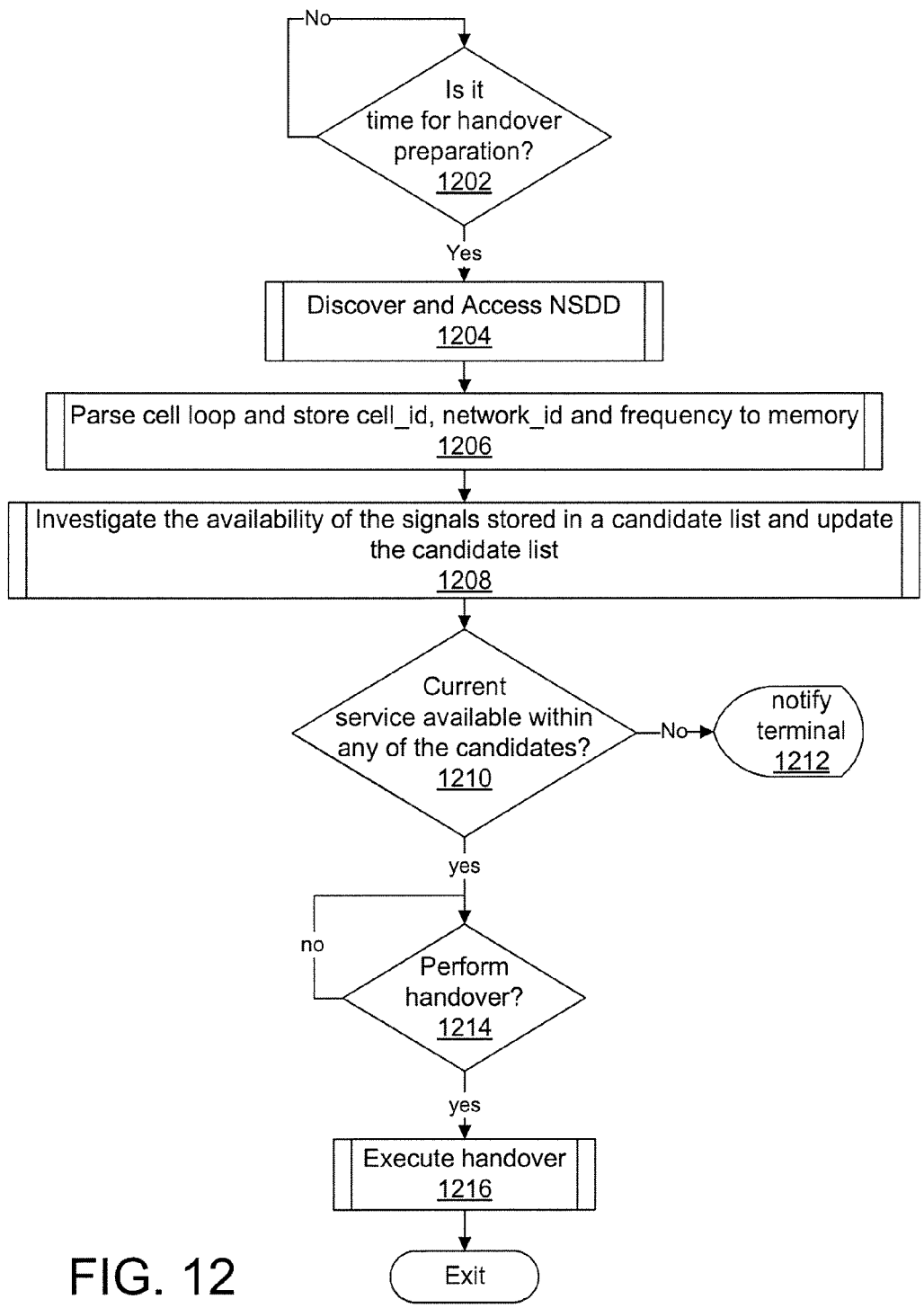
FIG. 12 is a flowchart showing steps in accordance with at least one aspect of the invention for the discovery of neighboring-cell availability and service availability in neighboring cells.

FIG. 12 is a flowchart showing steps in accordance with at least one aspect of the invention for the discovery of neighboring-cell availability and service availability in neighboring cells.

A determination is made at 1202 with respect whether it is time to prepare for a handover. If it is not, the "no" branch is followed until a determination is made that it is time for handover preparation, at which point the "yes" branch from 1202 will be followed. At 1204, neighboring service discovery descriptor (NSDD) is discovered and accessed. The cell loop is parsed and the cell identifier, network identifier, and frequency are stored to memory, as shown at 1206. The availability of the signals stored in a candidate list are investigated and updated, as shown at 1208. In accordance with at least one aspect of the invention, this investigation and updating is done by inspecting the availability of an initialization symbols within the signals, and unfound signals may be removed from the candidate list.

A determination is then made as to whether the current service is available within any of the candidates, as shown at 1210. If the current service is not available within any of the candidates, then the "no" branch from 1210 is followed, and the terminal is notified as shown at 1212. Otherwise, if the current service is available within one or more of the candidates, then the "yes" branch from 1210 is followed, and a determination is made as to whether a handover should be performed, as shown at 1214. If a handover should not be performed, then the "no" branch from 1214 will be followed thereby causing another determination to be made as to whether a handover should be performed, as shown at 1214. Otherwise, if a determination is made that a handover should be performed, then the yes branch from 1214 will be followed and a handover will be performed, as shown at 1216.

Figure 13:
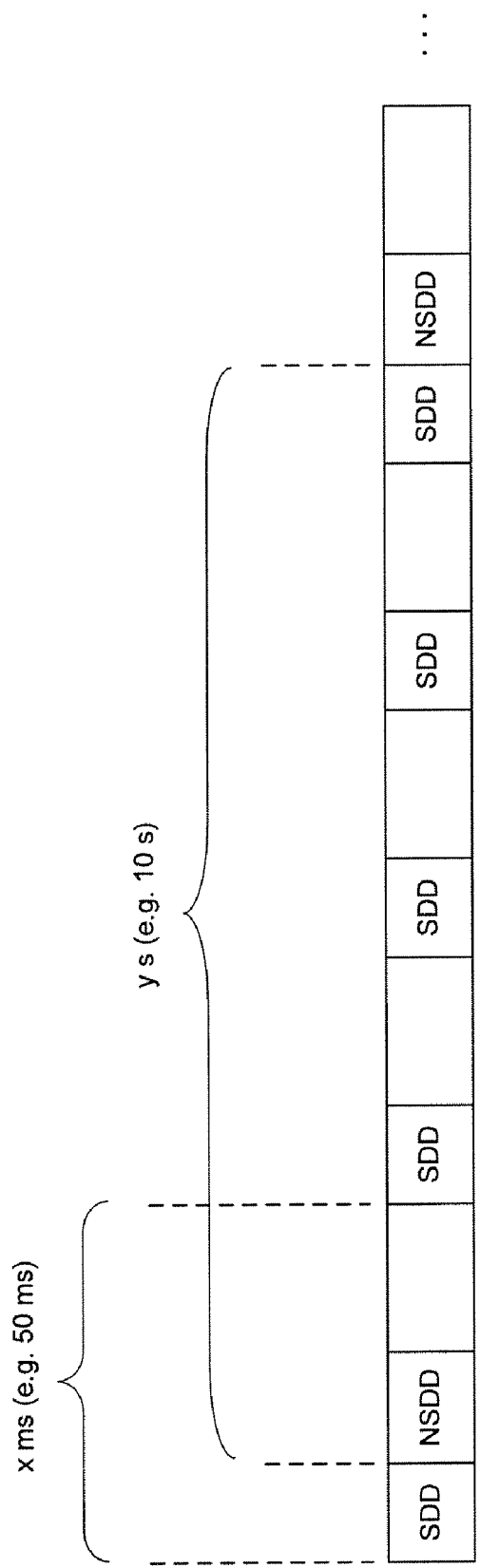
FIG. 13 shows a transmission scheme, in accordance with at least one aspect of the invention, for service discovery descriptor (SDD) and neighboring service discovery descriptor (NSDD).

FIG. 13 shows a transmission scheme, in accordance with at least one aspect of the invention, for service discovery descriptor (SDD) and neighboring service discovery descriptor (NSDD). In accordance with at least one aspect of the invention, SDD and/or NSDD may be transmitted within the intervals defined by any suitable standard or signaled to the terminal by a network operator, and the operator may decide how to use slots and frames to transmit SDD and/or NSDD as long as the transmission meets set or signaled minimum repetition intervals.

In accordance with at least one aspect of the invention, a receiver may inspect slots within a given repetition interval (e.g. 50 ms for SDD and 10 s for NSDD) to try to find SDD and/or NSDD. A suitable repetition interval for NSDD may be determined based on how frequently it is desirable to have updated handover-candidate information. Such a determination may be made based on a minimum size of a cell and an expected maximum speed of a terminal, for example.

Figure 14:
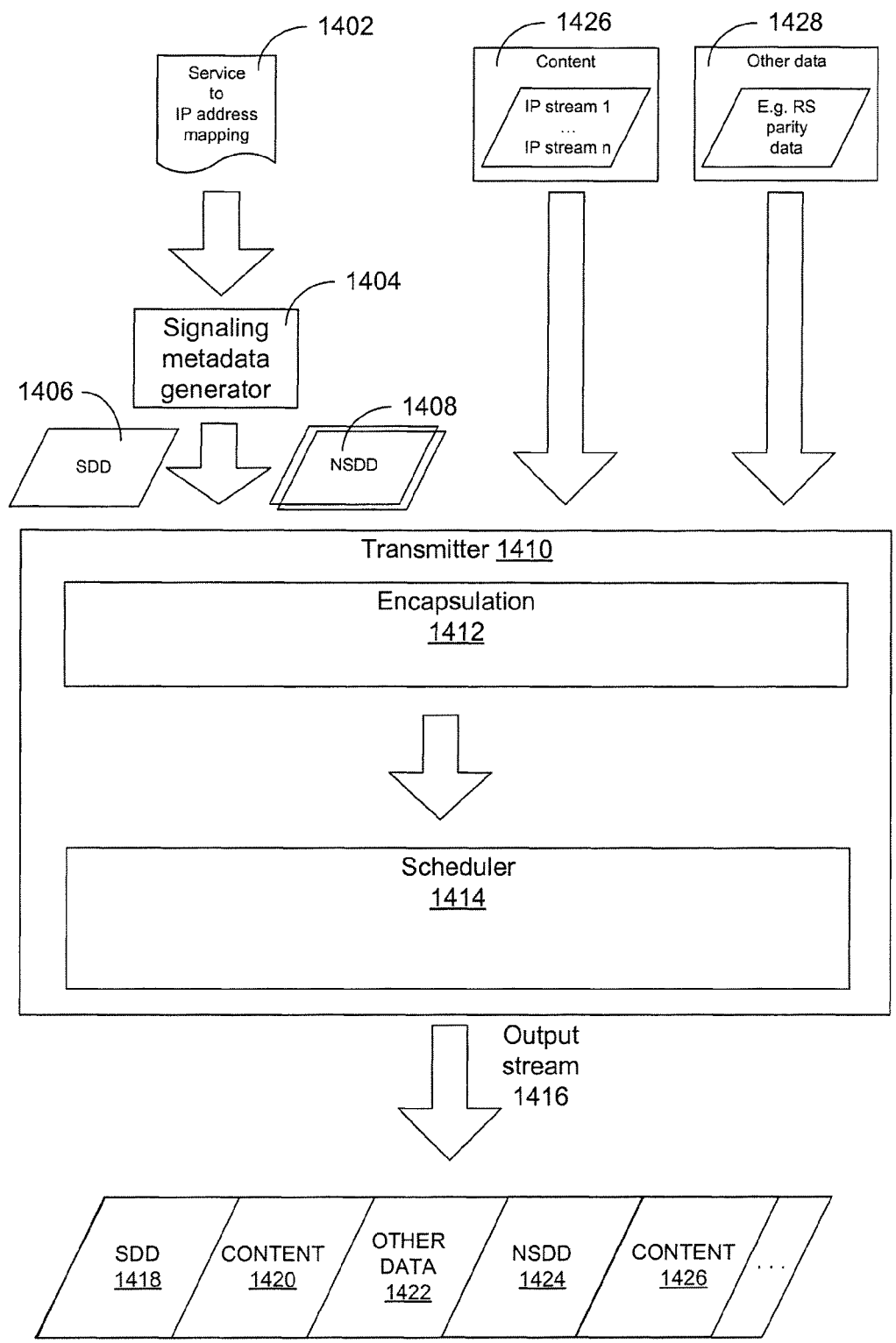
FIG. 14 is a data flow diagram of a transmitter system in accordance with at least one aspect of the invention.

FIG. 14 is a data flow diagram of a transmitter system in accordance with at least one aspect of the invention. As shown in FIG. 14, service-to-IP-address-mapping information is input to signaling metadata generation module 1404, the output of which is SDD data 1406 and NSDD data 1408, which is input to transmitter 1410. Content 1426, which is carried in IP streams, and other data 1428, such as Reed-Solomon (RS) parity data, may also be input to the transmitter 1410.

The transmitter includes an encapsulation module 1412, the output of which is input to the scheduler 1414. The output of the transmitter 1410 is an output stream 1416 containing a service discovery descriptor 1418, content 1420, other data 1422, and a neighboring service discovery descriptor 1424.

In the embodiments discussed above, data is transmitted in packets of fixed size, but the signaling descriptors and IP datagrams may be of variable length. As such, an encapsulation protocol that encapsulates such data in fixed length packets would be desirable. A Data Stream Protocol (DSP), in accordance with at least one aspect of the invention, allows different types of data to be carried within fixed length data stream (DS) packets.

Figure 15:
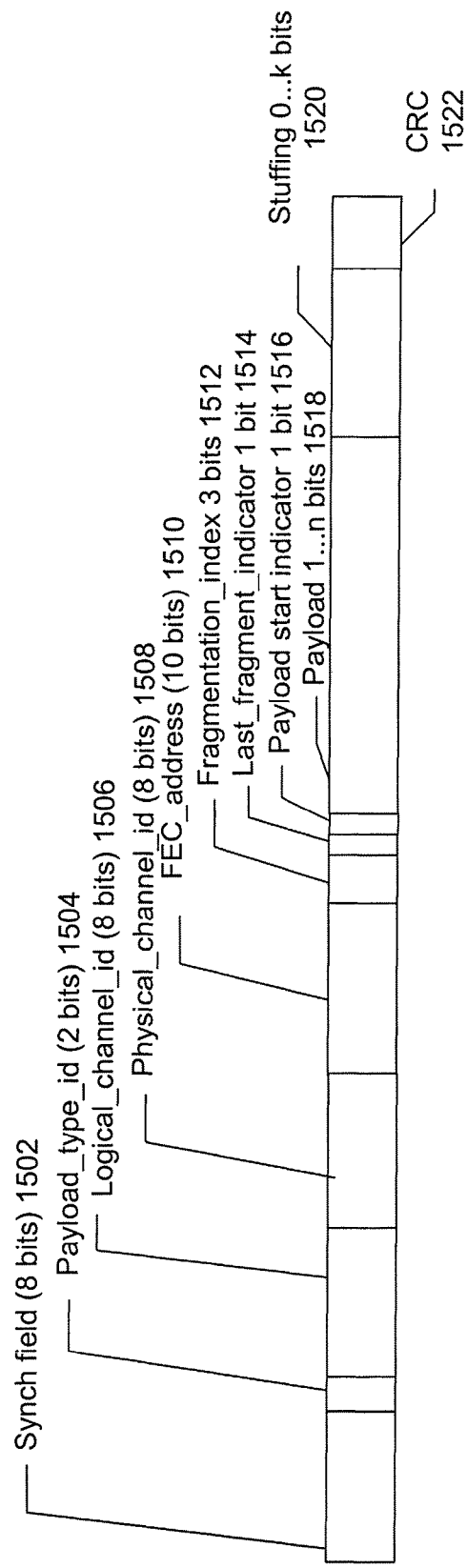
FIG. 15 illustrates an exemplary structure of a data stream protocol packet, in accordance with one or more aspects of the invention.

FIG. 15 illustrates an examplary structure of a DSP packet, in accordance with one or more aspects of the invention.

Synchronization field 1502 enables detection of the beginning of each DSP packet within a receiver and a network. In accordance with at least one aspect of the invention, synchronization field contains 8 bits. As is the case with other fields and parameters disclosed herein having a particular number of bits, the synchronization field may contain any other suitable number of bits.

Payload type identifier 1504 (e.g., payload_type_id) may be used for identifying the payload type encapsulated within the payload. For example, payload type identifier may specify a payload type including, but not limited service discovery descriptor, (SDD), neighboring service discovery descriptor (NSDD), Internet Protocol (IP), Reed-Solomon (RS) and the like.

Logical channel identifier 1506 (e.g., logical_channel_id) may be used for identifying a logical channel of an associated packet. This identifier may be used by a receiver for discovering the packets part of specific logical channel when there are packets from more than one logical channel available within a particular slot.

Physical channel identifier 1508 (e.g., physical_channel_id) may be used for identifying a physical channel in which an associated DS packet is carried. A physical channel identifier enables a network element to allocate DSP packets into correct physical channels.

Forward Error Correction address 1510 (e.g., FEC_address) may be used for mapping DS packets carrying application data with corresponding DS packets carrying RS data when FEC is used. If FEC is not used, this field can be ignored.

Fragmentation index 1512 (e.g., Fragmentation_index) is a counter for the payload fragments encapsulated within DSP packets. Fragmentation index 1512 enables a receiver to decapsulate the payload in the correct order, e.g., in case some of the packets are lost.

Last fragment indicator 1514 (e.g., last_fragment_indicator) may be used for indicating a last fragment of an encapsulated payload.

Payload start indicator 1516 (e.g., Payload_start_indicator) may be used for indicating whether a current DSP packet carries the first fragment of an encapsulated payload. Payload 1516 is the payload of a DSP packet.

Stuffing bits 1520 are bits that may be added if a packet is not full. And Cyclic Redundancy Check (CRC) 1522 is a well known way for checking that a received block of data is free from errors.

In accordance with at least one aspect of the invention, DSP packets have a fixed size. The size of the packet may be determined based on an error correction code, the length of the interleaver, and the length of a symbol.

Figure 16:
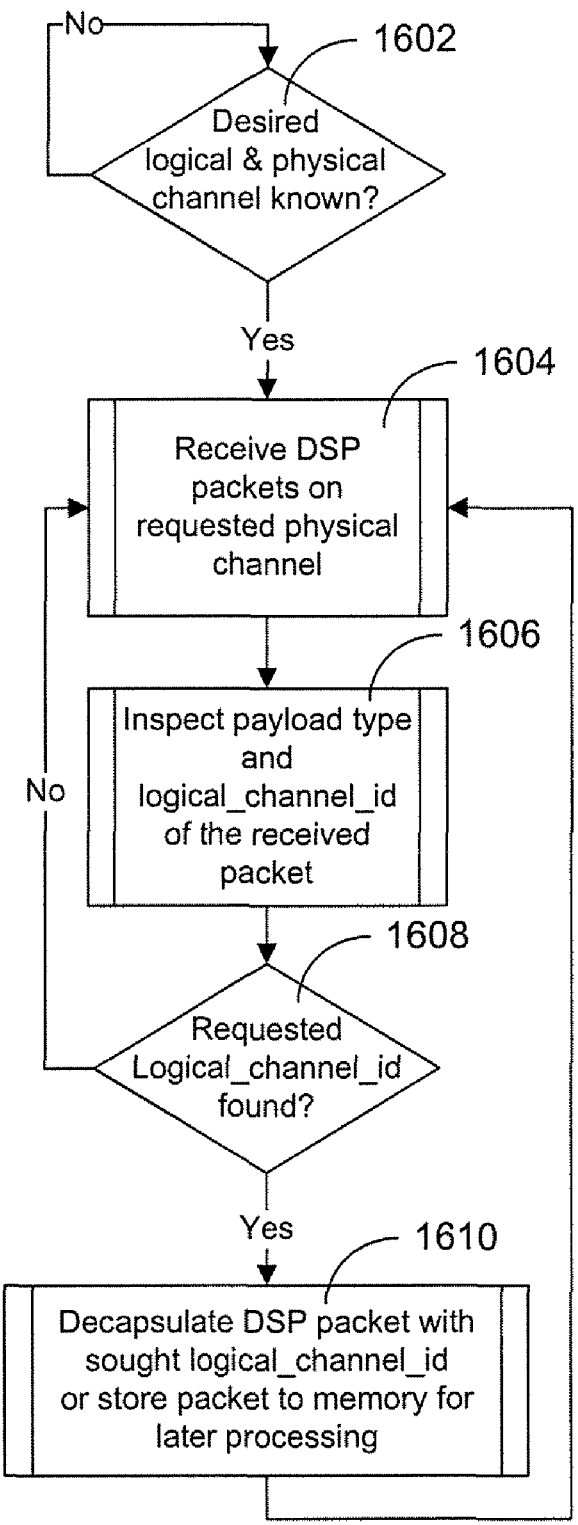
FIG. 16 is a flow chart showing steps for receiving data stream protocol packets in accordance with one or more aspects of the invention.

FIG. 16 is a flow chart showing steps for receiving DSP packets in case of IP and Reed-Solomon (RS) data in accordance with one or more aspects of the invention.

A determination is made, as shown at 1602, with respect to whether a desired logical and physical channel is known. If they are not known, then the "no" branch from 1602 loops back to 1602 until they are known. Otherwise, if the desired logical and physical channel are known, then the yes branch from 1602 is followed.

DSP packets are received on the requested physical channel as shown at 1604. The payload type and the logical channel identifier of the received packet are inspected, as shown at 1606. A determination is then made, as shown at 1608, with respect to whether the requested logical channel has been found. If the requested logical channel has not been found, the "no" branch from 1608 will be followed to 1604. Otherwise, if the requested logical channel has been found, then the "yes" branch from 1608 will be followed. The DSP packet with the selected logical channel identifier will then be decapsulated, or the packet may be stored to memory for later processing, as shown at 1610. Processing then loops back to 1604. As mentioned above, the fragmentation index and/or the last fragment indicator may be used to ensure that payload is decapsulated in an appropriate order.

Figure 17:
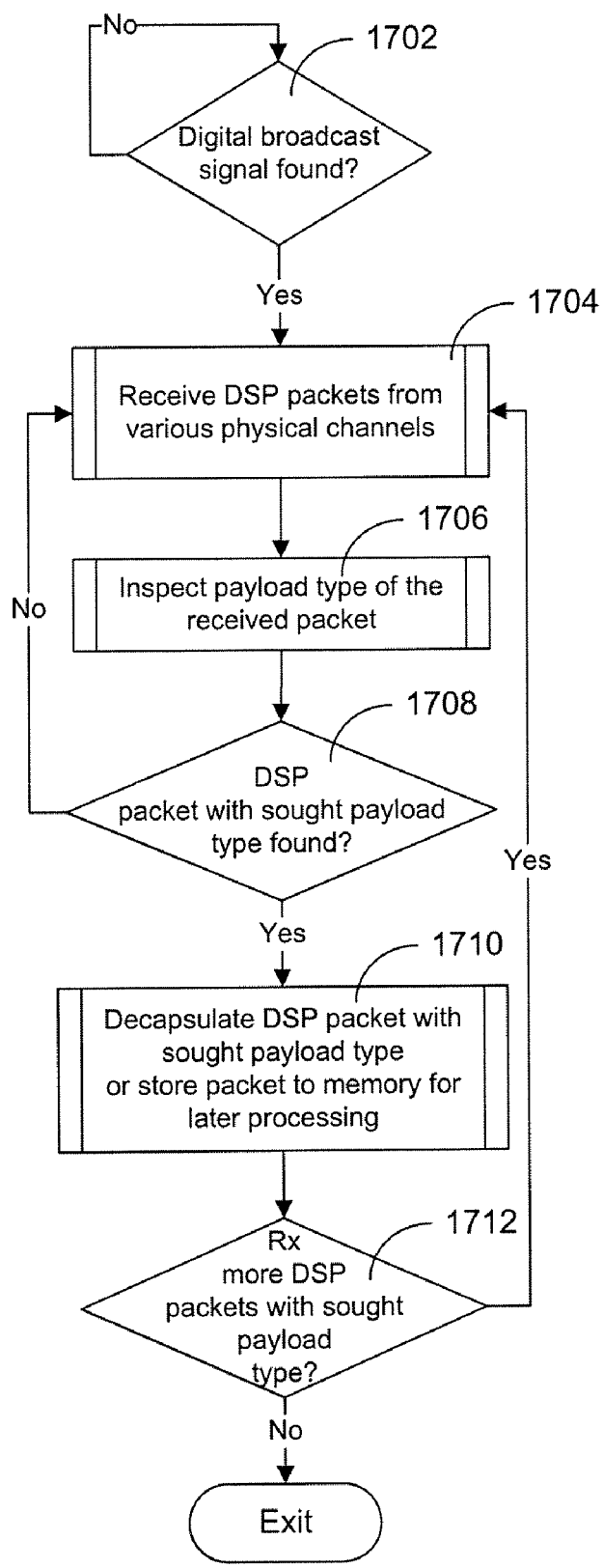
FIG. 17 is a flow chart showing steps for receiving data stream protocol packets in accordance with one or more aspects of the invention.

FIG. 17 is a flow chart showing steps for receiving DSP packets in case of reception of SDD and NSDD in accordance with at least one aspect of the invention.

A determination is made, as shown at 1702, with respect to whether a receiver has found a digital broadcast signal, such as, for example, a signal that carries DVB-H type services. If the receiver has not found a sought digital broadcast signal, then the "no" branch from 1702 loops back to 1702 and the determination is made again. Otherwise, if the receiver has found a sought digital broadcast signal, then the "yes" branch from 1702 is followed, and DSP packets are received from various physical channels, as shown at 1704. In accordance with at least one aspect of the invention, DSP packets from substantially all slots (or physical channels) are received.

The payload type of the received packet is inspected, as shown at 1706, and a determination is made with respect to whether the sought type (e.g., SDD or NSDD) of received DSP packet has been found, as shown at 1708. If the sought type of received DSP packet has not been found, the "no" branch from 1708 will be followed to 1704. Otherwise, if the sought type of received DSP packet has been found, the "yes" branch from 1708 will be followed, and the DSP packet with the sought payload type will be decapsulated, or stored to memory for later processing, as shown at 1710.

A determination is then made with respect to whether more DSP packets with the sought payload type should be received, as shown at 1712. The fragmentation index and/or the last fragment indicatory may be used to detect whether more DSP packets should be received. If more DSP packets with the sought payload type should not be received, the "no" branch from 1712 will be followed and processing will be finished. Otherwise, if more DSP packets with the sought payload type should be received, the "yes" branch from 1712 will be followed to 1704.

Encapsulation of DSP packets, in accordance with at least one aspect of the invention, results in reduced overhead when compared to MPEG-2 TS or Generic Stream Encapsulation (GSE) because, for example, IP data has a single encapsulation mechanism.

In conventional DVB, there is MPE and MPEG-2 transmission stream. In Digital Video Broadcast—Satellite—Second Generation (DVB-S2), there is Generic Stream Encapsulation (GSE) and baseband frame (BBframe). Generic Streams (GS) are a kind of input stream in DVB-S2. GS can be used either in Packetized mode with fixed-size packets, or in Continuous mode, which is a stream of octets, not having any structure or packet boundaries. The Generic Stream Encapsulation (GSE) protocol, which is under definition within the Generic Data Broadcasting & Service Information Protocols (GBS) group of DVB, provides an efficient mean for encapsulating IP and other network layer packets over the generic Stream profile of the DVB-S2 physical layer.

In DVB-S2, a transmission frame consists of a 90-bit physical layer header providing a preamble and identifying the Modulation Coding (ModCod) used. The payload of a physical layer frame is known as a baseband frame (BBframe) and includes a 10 byte signalling header, which is followed by the BBframe payload. The size of this payload depends on the ModCod that was selected and can be up to 8 KB, significantly larger than an MPEG-2 TS Packet.

Figure 18:
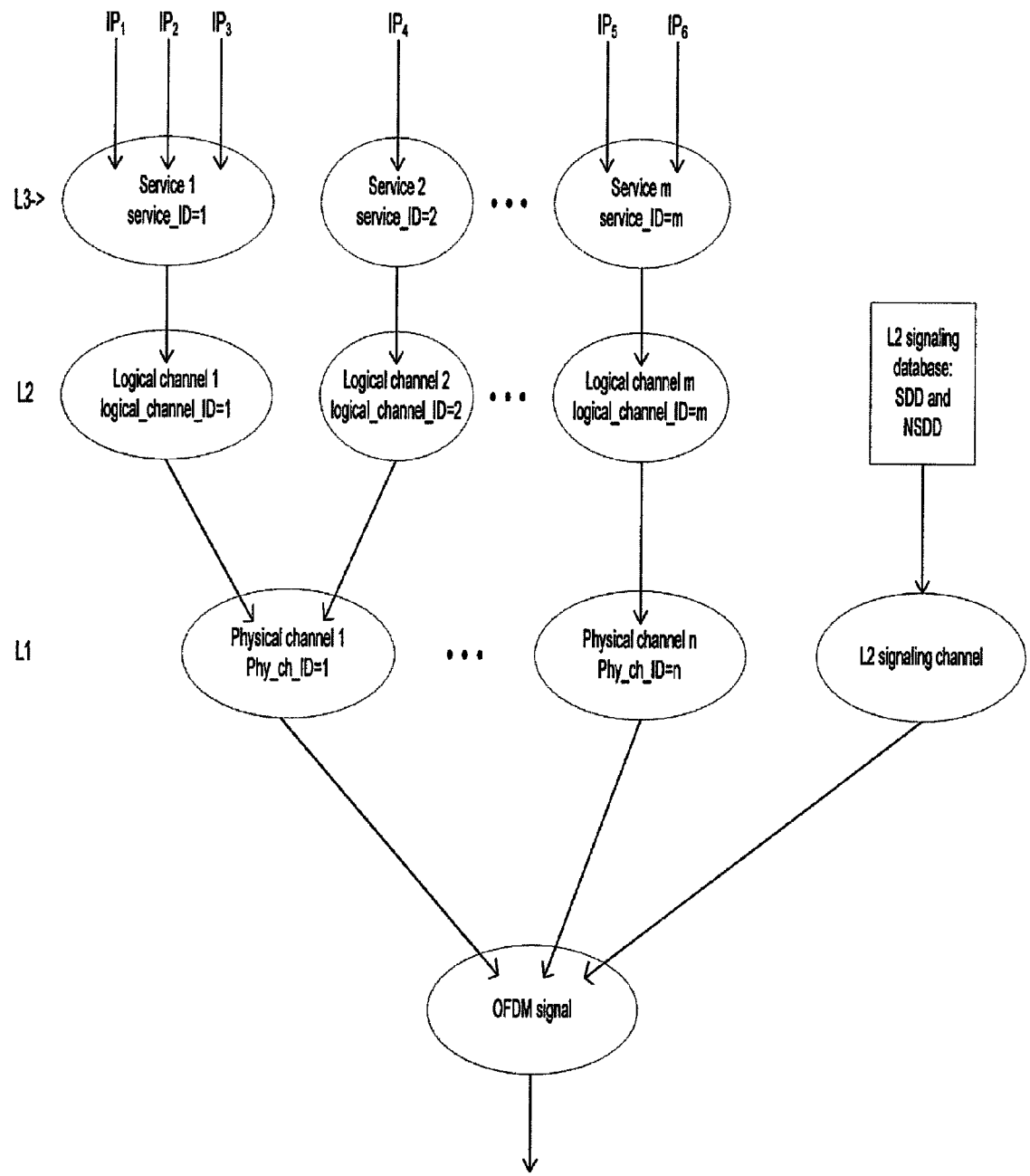
FIG. 18 shows exemplary mapping of services to logical channels and further to physical channels in accordance with one or more aspects of the invention.

FIG. 18 shows mapping of services to logical channels and further to physical channels in accordance with one or more aspects of the invention. Service to logical channel mapping is a one-to-one mapping. A physical channel can carry one or more logical channels.

One service may include one or more IP streams. Each service may have a unique service identifier. This service identifier and the corresponding IP addresses may be listed in ESG data. In data link layer (L2), the services are mapped into the logical channels. This is one-to-one mapping, and the service identifier uniquely determines the logical channel identifier. L2 signaling may have a dedicated signaling channel in the physical layer.

Figure 19:
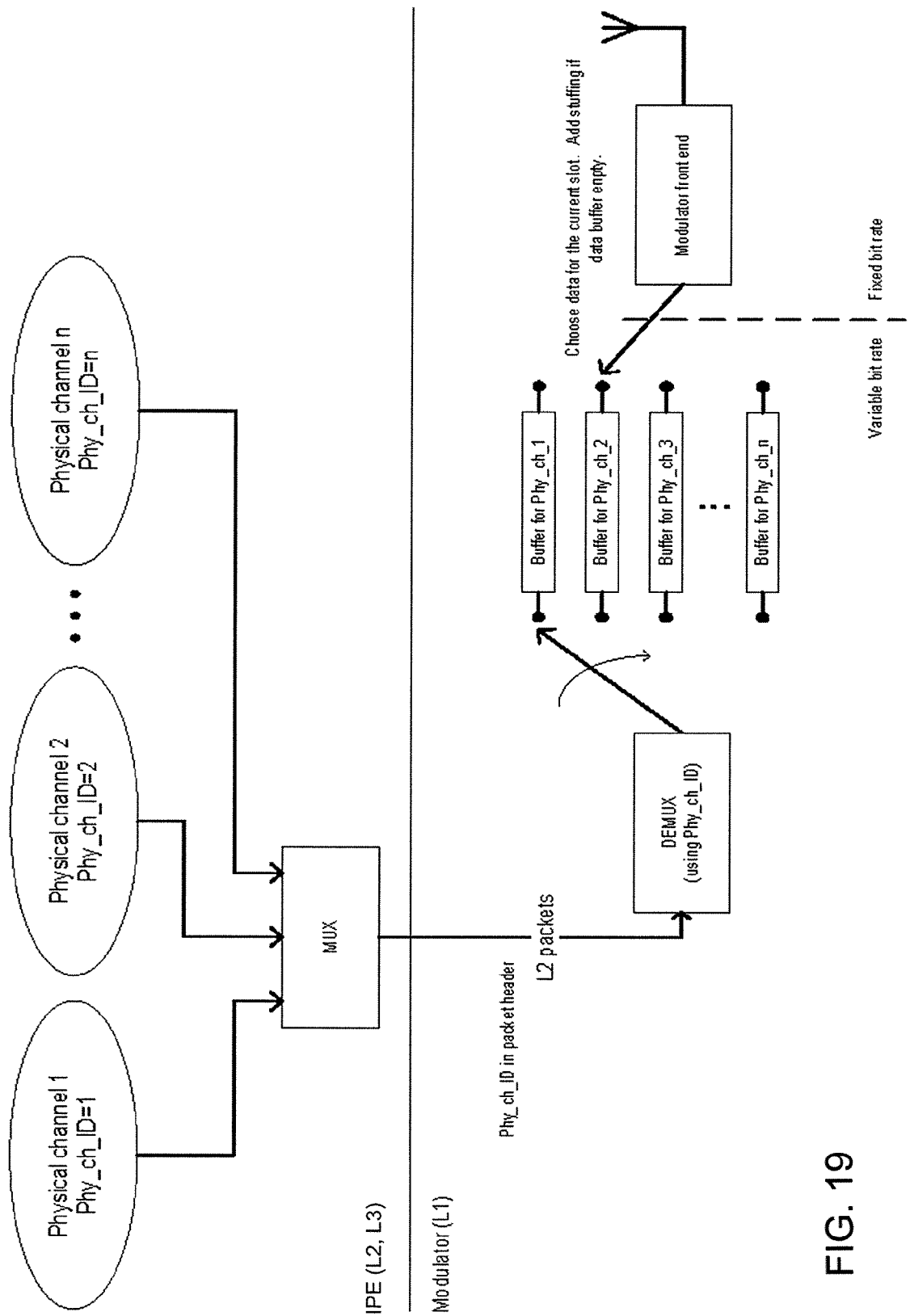
FIG. 19 shows exemplary mapping of physical channels into time-division multiplexed slots in a modulator, in accordance with at least one aspect of the invention.

FIG. 19 shows mapping of physical channels into time-division multiplexed slots in a modulator, in accordance with at least one aspect of the invention.

Logical channels are mapped into the physical channels as shown in FIG. 18. One physical channel can carry one or more logical channels, but one logical channel can not be divided between multiple physical channels.

Physical channels are L1 layer time division multiplexing (TDM) channels each having a dedicated time slot in the OFDM signal. One physical channel reserves the OFDM transmission capacity during the slot. There may be a fixed integer number of OFDM symbols in each slot. The idea of the physical channel can be extended in such a way that instead of reserving one slot it can reserve multiple slots.

Physical channels can have dedicated Quality of Service (QoS) parameters including, but not limited to, code rate, modulation, average bit rate (depends on the slot interval and size), access delay (depends on the slot interval), power saving (depends on the slot duration and interval), and the like.

FIG. 19 shows an example implementation for the mapping of the physical channels into TDM slots. In Internet Protocol Encapsulator (IPE), the physical channels are multiplexed into a stream of L2 packets. In the modulator, there is a buffer for each physical channel, and L2 packets are written into the corresponding buffer according to Phy_ch_id. The front end of the modulator then forms a TDM slot by selecting data from one physical channel buffer. The selection may be performed according to the parameters defining the physical channel-to-slot mapping.

L2 packets are not sent to the modulator with a fixed clock rate specified by the modulator bit rate as is done in the DVB-T transport stream. Therefore, buffers are needed as an interface between the variable and the fixed bit rate parts of the modulator. An alternative is to move buffers and some other functionality of the modulator to the IPE. In this case, the IPE forms the TDM slots and sends them to the modulator with a fixed clock rate.

One or more aspects of the invention may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), application specific integrated circuits (ASIC) and the like.

Embodiments of the invention include any novel feature or combination of features disclosed herein either explicitly or any generalization thereof. While embodiments of the invention have been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

We claim:

1. A method comprising:
   receiving, at a receiver device, a fixed size data stream protocol packet that comprises a payload;
   inspecting, by a processor, a payload type of the fixed size data stream protocol packet;
   determining that the payload type indicates that the payload includes service discovery descriptor data, and, in response, decapsulating the fixed size data stream protocol packet;
   determining to receive at least one additional fixed size data stream protocol packet of the payload type;
   repeating the receiving, inspecting, and decapsulating for the at least one additional fixed size data stream protocol packet, resulting in a plurality of service discovery descriptor data that includes service discovery descriptor data of the fixed size data stream protocol packet and additional service discovery descriptor data of the at least one additional fixed size data stream protocol packet; and
   generating, at the receiver device, a service discovery descriptor based on the plurality of service discovery descriptor data, wherein the service discovery descriptor identifies at least one service available for data streaming from a current cell or from at least one neighboring cell, wherein a length of the service discovery descriptor differs from a length of the fixed size data stream protocol packet.

2. The method of claim 1, wherein the fixed size data stream protocol packet is configured to carry variable length signaling descriptors.

3. The method of claim 1, wherein the determining to receive at least one additional fixed size data stream protocol packet of the payload type is based on a fragmentation index and a last fragment indicator from the fixed size data stream protocol packet.

4. The method of claim 1, wherein the step of receiving a fixed size data stream protocol packet that comprises a payload includes receiving the fixed size data stream protocol packet within a repetition interval.

5. The method of claim 4, further comprising receiving a different fixed size data stream protocol packet within the repetition interval, the different fixed size data stream protocol packet including a payload type that is different than the payload type of the fixed size data stream protocol packet.

6. The method of claim 1, wherein determining to receive at least one additional fixed size data stream protocol packet of the payload type is based on an analysis of the fixed size data stream protocol packet.

7. An apparatus comprising:
   a processor; and
   a computer readable medium storing computer executable instructions that when executed, cause the apparatus to at least:
      receive a fixed size data stream protocol packet that comprises a payload,
      inspect a payload type of the fixed size data stream protocol packet,
      determine that the payload type indicates that the payload contains service discovery descriptor data, and, in response, decapsulate the fixed size data stream protocol packet,
      determine to receive at least one additional fixed size data stream protocol packet of the payload type,
      in response to determining to receive at least one additional fixed size data stream protocol packet of the payload type, repeat the receiving, inspecting, and decapsulating for the at least one additional fixed size data stream protocol packet, resulting in a plurality of service discovery descriptor data that includes service discovery descriptor data of the fixed size data stream protocol packet and additional service discovery descriptor data of the at least one additional fixed size data stream protocol packet, and
      generate a service discovery descriptor based on the plurality of service discovery descriptor data, wherein the service discovery descriptor identifies at least one service available for data streaming from a current cell or from at least one neighboring cell, wherein a length of the service discovery descriptor differs from a length of the fixed size data stream protocol packet.

8. The apparatus of claim 7, wherein the fixed size data stream protocol packet is configured to carry variable length signaling descriptors.

9. The apparatus of claim 7, wherein the apparatus is part of a system that includes a second apparatus, the second apparatus comprising:
   a second processor; and
   a second computer readable medium that contains computer executable instructions that when executed cause the second apparatus to at least:
      encapsulate second signaling metadata and second digital broadcast content into second encapsulated fixed size data stream protocol packets, wherein the second signaling metadata includes a second service discovery descriptor that identifies at least one service available for data streaming from the current cell or from the at least one neighboring cell, wherein a length of the second service discovery descriptor differs from a length of at least one of the second fixed size data stream protocol packets; and
      cause output of the second data stream protocol packets for transmission over a digital broadcast network.

10. A method comprising:
    encapsulating, by a processor, signaling metadata and digital broadcast content into encapsulated fixed size data stream protocol packets, the signaling metadata and the digital broadcast content being encapsulated into payloads of the encapsulated fixed size data stream protocol packets, wherein the signaling metadata includes a service discovery descriptor that identifies at least one service available for data streaming from a current cell or from at least one neighboring cell, wherein a length of the service discovery descriptor differs from a length of at least one of the fixed size data stream protocol packets, and wherein a first packet of the encapsulated fixed size data stream protocol packets includes a first portion of the service discovery descriptor in the payload and a payload type indicating that the payload includes service discovery descriptor data and a second packet of the encapsulated fixed size data stream protocol packets includes a second portion of the service discovery descriptor in the payload and a payload type indicating that the payload includes service discovery descriptor data, the first portion and the second portion being different portions of the service discovery descriptor; and
    causing output of the encapsulated fixed size data stream protocol packets for transmission over a digital broadcast network.

11. The method of claim 10, wherein the service discovery descriptor is electronic service guide-provider specific and cell specific.

12. The method of claim 10, wherein the service discovery descriptor provides a mapping between a service identifier, a logical channel identifier, and a physical channel.

13. The method of claim 10, wherein the service discovery descriptor is a neighboring service discovery descriptor that provides a mapping for one or more services available within one or more neighboring cells.

14. An apparatus comprising:
a processor; and
a computer readable medium storing computer executable instructions that, when executed, cause the apparatus to at least:
encapsulate signaling metadata and digital broadcast content into encapsulated fixed size data stream protocol packets, the signaling metadata and the digital broadcast content being encapsulated into payloads of the encapsulated fixed size data stream protocol packets, wherein the signaling metadata includes a service discovery descriptor that identifies at least one service available for data streaming from a current cell or from at least one neighboring cell, wherein a length of the service discovery descriptor differs from a length of at least one of the fixed size data stream protocol packets, and wherein a first packet of the encapsulated fixed size data stream protocol packets includes a first portion of the service discovery descriptor in the payload and a payload type indicating that the payload includes service discovery descriptor data and a second packet of the encapsulated fixed size data stream protocol packets includes a second portion of the service discovery descriptor in the payload and a payload type indicating that the payload includes service discovery descriptor data, the first portion and the second portion being different portions of the service discovery descriptor; and
cause output of the encapsulated data stream protocol packets for transmission over a digital broadcast network.

15. The apparatus of claim 14, wherein the service discovery descriptor is electronic service guide-provider specific and cell specific.

16. The apparatus of claim 14, wherein the service discovery descriptor provides a mapping between a service identifier, a logical channel identifier, and a physical channel.

17. The apparatus of claim 14, wherein the neighboring service discovery descriptor provides a mapping for one or more services available within one or more neighboring cells.

18. The method of claim 14, wherein the step of causing output of the encapsulated data stream protocol packets for transmission over a digital broadcast network includes:
causing output of encapsulated data stream protocol packets that include service discovery descriptor data in the payload according to a repetition interval, wherein the repetition interval identifies a time period in which at least one encapsulated data stream protocol packet that includes service discovery descriptor data in the payload is caused to be transmitted.

19. A non-transitory computer readable medium storing computer executable instructions that, when executed, cause an apparatus to at least:
receive a fixed size data stream protocol packet that comprises a payload;
inspect a payload type of the fixed size data stream protocol packet;
determine that the payload type indicates that the payload contains service discovery descriptor data, and, in response, decapsulate the fixed size data stream protocol packet;
determine to receive at least one additional fixed size data stream protocol packet of the payload type;
in response to determining to receive at least one additional fixed size data stream protocol packet of the payload type, repeat the receiving, inspecting, and decapsulating for the at least one additional fixed size data stream protocol packet, resulting in a plurality of service discovery descriptor data that includes service discovery descriptor data of the fixed size data stream protocol packet and additional service discovery descriptor data of the at least one additional fixed size data stream protocol packet; and
generate a service discovery descriptor based on the plurality of service discovery descriptor data, wherein the service discovery descriptor identifies at least one service available for data streaming from a current cell or from at least one neighboring cell, wherein a length of the service discovery descriptor differs from a length of the fixed size data stream protocol packet.

20. The non-transitory computer readable medium of claim 19, wherein the service discovery descriptor is electronic service guide-provider specific and cell specific.

21. The non-transitory computer readable medium of claim 19, wherein the service discovery descriptor provides a mapping between a service identifier, a logical channel identifier, and a physical channel.

22. The non-transitory computer readable medium of claim 19, wherein the service discovery descriptor is a neighboring service discovery descriptor that provides a mapping for one or more services available within one or more neighboring cells.

23. A non-transitory computer readable medium storing computer executable instructions that when executed cause an apparatus to at least:
encapsulate signaling metadata and digital broadcast content into encapsulated fixed size data stream protocol packets, the signaling metadata and the digital broadcast content being encapsulated into payloads of the encapsulated fixed size data stream protocol packets, wherein the signaling metadata includes a service discovery descriptor that identifies at least one service available for data streaming from a current cell or from at least one neighboring cell, wherein a length of the service discovery descriptor differs from a length of at least one of the fixed size data stream protocol packets, and wherein a first packet of the encapsulated fixed size data stream protocol packets includes a first portion of the service discovery descriptor in the payload and a payload type indicating that the payload includes service discovery descriptor data and a second packet of the encapsulated fixed size data stream protocol packets includes a second portion of the service discovery descriptor in the payload and a payload type indicating that the payload includes service discovery descriptor data the first portion and the second portion being different portions of the service discovery descriptor; and
cause output of the encapsulated data stream protocol packets for transmission over a digital broadcast network.

24. The non-transitory computer readable medium of claim 23, wherein the service discovery descriptor is electronic service guide-provider specific and cell specific.

25. The non-transitory computer readable medium of claim 23, wherein the service discovery descriptor provides a mapping between a service identifier, a logical channel identifier, and a physical channel.

26. The non-transitory computer readable medium of claim 23, wherein the service discovery descriptor is a neighboring service discovery descriptor that provides a mapping for one or more services available within one or more neighboring cells.

* * * * *